United States Patent
Lee

(10) Patent No.: US 7,490,176 B2
(45) Date of Patent: Feb. 10, 2009

(54) SERIAL ATTACHED SCSI BACKPLANE AND DETECTION SYSTEM THEREOF

(75) Inventor: Chun-Liang Lee, Taipei (TW)

(73) Assignee: Inventec Corporation, Taipei (TW)

( * ) Notice: Subject to any disclaimer, the term of this patent is extended or adjusted under 35 U.S.C. 154(b) by 192 days.

(21) Appl. No.: 11/675,472

(22) Filed: Feb. 15, 2007

(65) Prior Publication Data

US 2008/0201512 A1    Aug. 21, 2008

(51) Int. Cl.
*G06F 3/00* (2006.01)
(52) U.S. Cl. .......................................... 710/17; 710/74
(58) Field of Classification Search .................... 710/15, 710/17, 18, 62, 72, 74, 110, 305, 316
See application file for complete search history.

(56) References Cited

U.S. PATENT DOCUMENTS

| | | | |
|---|---|---|---|
| 2006/0174085 A1* | 8/2006 | Wu et al. ..................... | 711/170 |
| 2007/0079032 A1* | 4/2007 | Bissessur et al. .............. | 710/71 |
| 2007/0233781 A1* | 10/2007 | Starr et al. ................... | 709/203 |
| 2008/0034122 A1* | 2/2008 | Kubo et al. .................. | 709/250 |
| 2008/0126851 A1* | 5/2008 | Zadigian et al. ................ | 714/7 |

OTHER PUBLICATIONS

Serial Attached SCSI Physical Layer, Rob Elliot, Sep. 30, 2003.*
3M Mini Serial Attached SCSI (miniSAS) Cable Assembly, Jul. 3, 2007.*
SFF-8485 Specification For Serial GPIO (SGPIO) Bus, Jan. 2, 2006.*

\* cited by examiner

*Primary Examiner*—Khanh Dang
(74) *Attorney, Agent, or Firm*—J.C. Patents

(57) ABSTRACT

A serial attached SCSI (SAS) backplane and detection system thereof are provided. When a first SAS backplane is not serially connected to a second SAS backplane, a logic signal with first status value provided by a signal unit of first SAS backplane is output to a master control unit through a second pin. When the first SAS backplane is serially connected to the second SAS backplane, a logic signal with second status value provided by a signal unit of second SAS backplane is transmitted to a first pin of the first SAS backplane though a third pin of second SAS backplane and output to the master control unit through the second pin of first SAS backplane. Therefore, the master control unit determines whether the first SAS backplane is serially connected to the second SAS backplane according to the received logic signal with the first or the second status value.

21 Claims, 2 Drawing Sheets

SERIAL ATTACHED SCSI BACKPLANE AND DETECTION SYSTEM THEREOF

BACKGROUND OF THE INVENTION

1. Field of the Invention

The present invention relates to a serial attached small computer systems interface (SAS). More particularly, the present invention relates to an SAS backplane detection system applied to a server to detect the number of the SAS backplanes serially connected to a system board of the server.

2. Description of Related Art

Servers have powerful functions for helping users to process a mass of complicated affairs and providing entertainment for the users. Particularly, for enterprises, the servers are indispensable equipments in information processing system architectures of enterprises. In current servers, an operating speed of a processing unit is quite quick, and for example the storing capacity of a storing apparatus of a hard disk driver (HDD) is quite large. However, the entire performance of the server is affected by a data transmission speed of the HDD, and this effect is more distinct particularly for the server installed with a plurality of HDDs. Therefore, the current HDD transmission interface is gradually developed to be a serial ATA interface, an SAS interface with quicker transmission speed from a parallel advanced technology attachment (ATA), i.e. an integrated device electronic (IDE) interface, thus improving the entire performance of the server.

At present, two groups of SAS backplanes can be connected onto a system board of the server at the same time, and the two groups of SAS backplanes are serially connected through an SAS cable, for the users to insert a required number of HDDs on the SAS backplane according to the practical requirements for the storing capacity. However, the current server does not have an effective detection mechanism for a baseboard management controller (BMC) on the system board of the server to detect whether the two groups of SAS backplanes are serially connected to set a rotating speed of a heatsink fan of the server system accordingly. Currently, the common method is that the software engineer respectively writes BIOS programs corresponding the conditions that the server has one SAS backplane or two SAS backplanes serially connected for the BMC, and selects the corresponding BIOS program to set the rotating speed of the system fan according to the server has an SAS backplane or two SAS backplanes serially connected informed by the users. The steps of the method are complicated, and the BMC cannot effectively set the rotating speed of the system fan in time to make the system operate in the optimal setting.

Therefore, it is a task to be solved in the industry how to provide an SAS backplane detection system to overcome various advantages of the conventional art.

SUMMARY OF THE INVENTION

Accordingly, the present invention is directed to provide an SAS backplane detection system, applied to a server to quickly and effectively acquire whether a serially connected SAS backplane exists in the server, so as to set the system parameters of the server accordingly and to make the server operate in the optimal setting.

In order to solve the above problem, the present invention provides an SAS backplane detection system for detecting whether a second SAS backplane serially connecting to the first SAS backplane exists in the server. The first and the second SAS backplanes respectively have a first pin, a second pin, and a third pin. When the second SAS backplane is serially connected to the first SAS backplane, the first pin of the first SAS backplane is connected to the third pin of the second SAS backplane. The SAS detection system includes a first signal unit, a second signal unit, a first connecting unit, a second connecting unit, and a master control unit. The first signal unit is disposed in the first SAS backplane, so as to provide a logic signal with a first status value. The second signal unit is disposed in the second SAS backplane, so as to provide a logic signal with a second status value. The first connecting unit is electrically connected to the first pin and the second pin of the first SAS backplane, and the first signal unit. The second connecting unit is electrically connected to the third pin in the second SAS backplane and the second signal unit. The master control unit is disposed in the system board of the server, and is connected to the second pin of the first SAS backplane. When the first SAS backplane is not serially connected to the second SAS backplane, the logic signal with the first status value provided by the first signal unit is input to the master control unit through the second pin of the first SAS backplane. When the first SAS backplane is serially connected to the second SAS backplane, the logic signal with the second status value provided by the second signal unit is input to the master control unit through the third pin of the second SAS backplane, and the first pin and the second pin of the first SAS backplane. The master control unit determines whether the first SAS backplane is serially connected to the second SAS backplane according to the received logic signal with the first status value or the second status value, so as to set the system parameter of the server accordingly.

The present invention provides an SAS backplane, which includes a first SAS connector, a second SAS connector, a first signal unit, a second signal unit, a first connecting unit, and a second connecting unit. The first SAS connector has a first pin, and the second SAS connector has a second pin and a third pin. The first signal unit provides a logic signal with the first status value, and the second signal unit provides a logic signal with the second status value. The first connecting unit is electrically connected to the first pin, the second pin, and the first signal unit. The second connecting unit is electrically connected to the third pin and the second signal unit. When the SAS backplane is not serially connected to other SAS backplane, the logic signal with the first status value provided by the first signal unit is output to exterior through the second pin. When the SAS backplane is serially connected to other SAS backplane, the logic signal with the second status value provided by another SAS backplane is output to exterior through the first pin and the second pin of the local SAS backplane.

In the present invention, through the logic signal with the first status value provided by the first signal unit and the logic signal with the second status value provided by the second signal unit, the master control unit can determine whether the first SAS backplane is serially connected with the second SAS backplane, such that the master control sets the system parameters of the server according to the logic signal and makes the server system to operate in the optimal setting. Therefore, various disadvantages of the conventional art are avoided.

In order to the make aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Specific embodiments are used to illustrate the implementation of the present invention as follows. Those skilled in the art can easily understand other advantages and functions of the present invention from the content of the specification. The present invention is implemented or applied by other different embodiments, and the details in the specification can be modified and varied without departing from the spirit of the present invention based on different viewpoints and applications.

Figure 1:
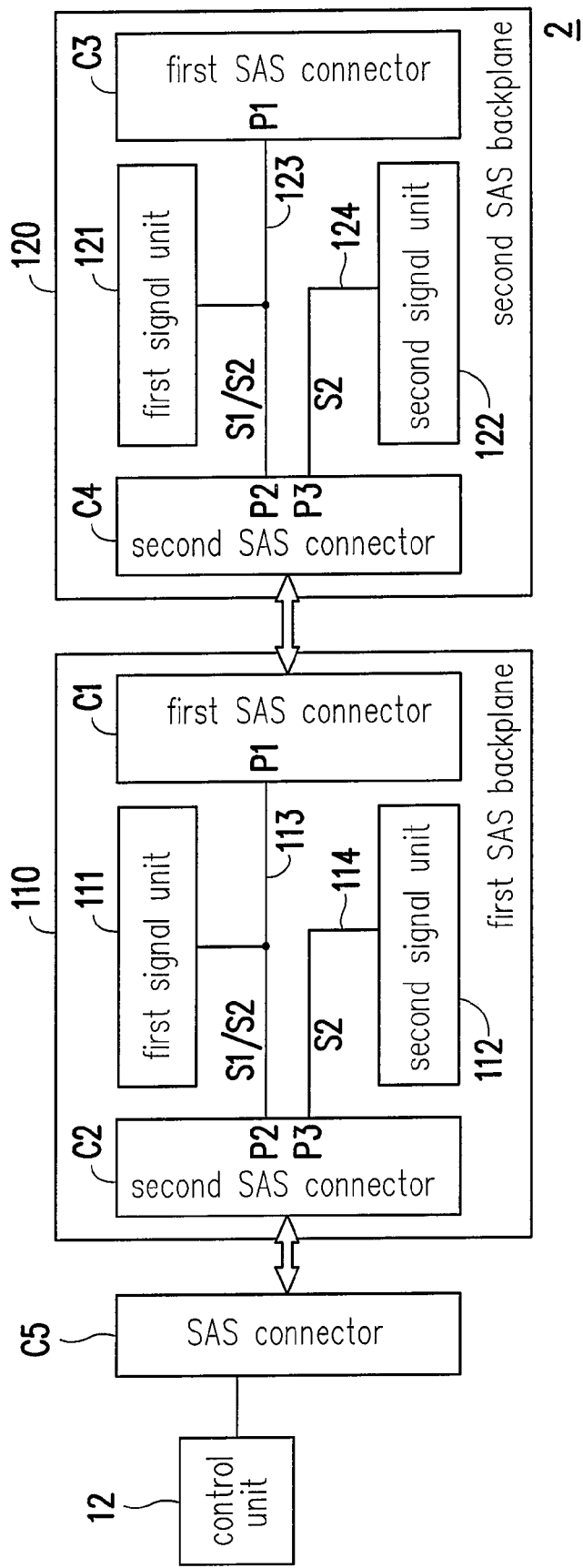
FIG. 1 is a block diagram of a basic architecture of an SAS backplane detection system according to an embodiment of the present invention.

FIG. 1 is a block diagram of a basic architecture of an SAS backplane detection system according to an embodiment of the present invention. As shown in FIG. 1, the SAS backplane detection system of the present invention is disposed on the system board 2 of the server. The SAS backplane detection system of this embodiment is mainly used to detect whether the first SAS backplane 110 is serially connected to the second SAS backplane 120. The SAS backplane detection system includes a first signal unit 111, a second signal unit 122, a first connecting unit 113, a second connecting unit 124, and a master control unit 12. The detailed description of the SAS backplane detection system of the present invention is given below.

The first signal unit 111 is disposed in the first SAS backplane 110 to provide a logic signal with a first status value S1. In the present invention, the first signal unit 111 is, for example, is a power source pad disposed on the first SAS backplane 110, for example, a pad p3v3. The second signal unit 112 is also disposed in the first SAS backplane 110 to provide a logic signal with a second status value S2. In the present invention, the second signal unit 112 is, for example, a ground pad disposed on the first SAS backplane 110. It should be noted that the first SAS backplane 110 has a first SAS connector C1 and a second SAS connector C2. The second SAS connector C2 is used as an output port, so as to electrically connect the SAS connector C5 of the system board 2. The first SAS connector C1 is used as an expansion port. The user can use the SAS connector C1 to serially connect the second SAS backplane 120 according to the requirements. The first connecting unit 113 electrically connects the first signal unit 111 to the pin P1 of the first SAS connector C1 and the pin P2 of the second SAS connector C2. The second connecting unit 114 electrically connects the second signal unit 112 to the pin P3 of the second SAS connector C2.

Similarly, the second SAS backplane 120 also has a first signal unit 121, a second signal unit 122, a first connecting unit 123, a second connecting unit 124, a first SAS connector C3, and a second SAS connector C4. Because the implementation of the second SAS backplane 120 can refer to that of the first SAS backplane 110, so the implementation details will not be described. For the second SAS backplane 120, the first SAS connector C3 can be selectively serially connected to another SAS backplane (not shown), and the second SAS connector C4 can be electrically connected to the first SAS connector C1 of the first SAS backplane 110 through an SAS cable. It should be noted that in addition to the structure as shown in FIG. 1, the first SAS backplane 110 and the second SAS backplane 120 include several electronic components. In order to simplify the illustration and the drawings, only the part relative to the present invention is shown.

The master control unit 12 is connected to the second SAS connector C2 of the first SAS backplane 111, so as to receive the logic signal S1 or S2 transmitted by the pin P2 of the second SAS connector C2. The logic signal of the pin P2 of the second SAS connector C2 is of the status value S1 or S2, so the master control unit 12 can determine whether the first SAS backplane 110 is serially connected to the second SAS backplane 120.

That is, if the first SAS backplane 110 is serially connected to the second SAS backplane 120 through the SAS cable, the second status value S2 of the logic signal provided by the second signal unit 122 is transmitted to the pin P1 of the first SAS connector C1 through the pin P3 of the second SAS connector C4, and then is output to the master control unit 12 through the first connecting unit 113 and the pin P2 of the second SAS connector C2. Therefore, according to the logic signal of the pin P2 of the second SAS connector C2 being of the second status value S2, the master control unit 12 can determine whether the first SAS backplane 110 is serially connected to the second SAS backplane 120.

If the first SAS backplane 110 is not serially connected to the second SAS backplane 120, the logic signal with the first status value S1 provided by the first signal unit 111 is output to the master control unit 12 through the pin P2 of the first SAS connector C1. Therefore, if the status value of the logic signal received by the master control unit 12 is S1, it is determined that the first SAS backplane 110 is not serially connected to the second SAS backplane 120.

Next, according to whether the status value of the received logic signal being S1 or S2, the master control unit 12 sets the system parameters of the server, such that the server operates in the optimal setting. For example, according to whether the status value of the logic signal is S1 or S2, the master control unit 12 may set the system parameters, such as the total number of the hard disks in the system and the rotating speed of the heatsink fan.

Figure 2:
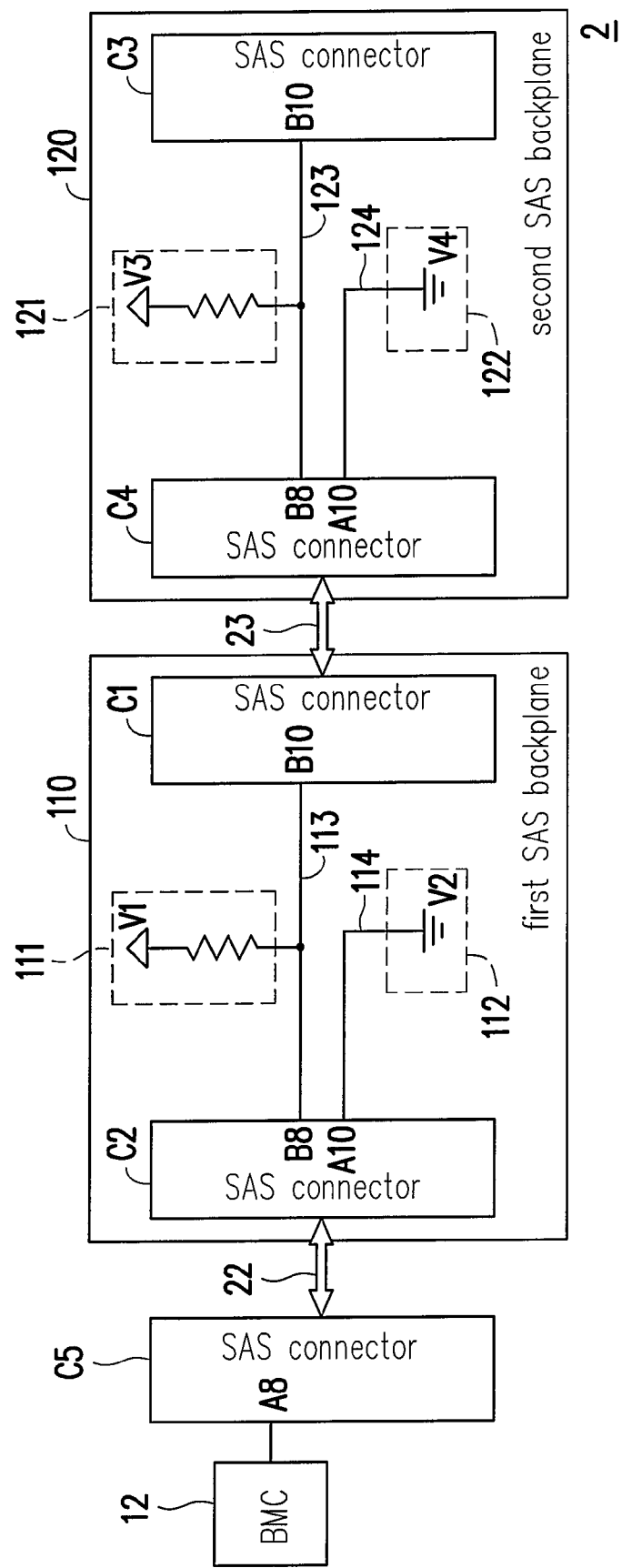
FIG. 2 is a circuit diagram of the SAS backplane of FIG. 1 being serially connected to another SAS backplane according to an embodiment of the present invention.

In order to further illustrate the disadvantages and the functions of the present invention, the detailed description of the SAS backplane detecting method of the embodiment is given as follows with FIG. 2. In the following, the connectors C1-C5 are mini-SAS connectors. As shown in FIG. 2, the system board 2 has a mini-SAS connector C5 and a master control unit 12. The master control unit 12 can be a BMC or another controller disposed on the system board 2. In this embodiment, the first SAS backplane 110 has a first signal unit 111, a second signal unit 112, a first connecting unit 113, a second connecting unit 114, a first SAS connector C1, and a second SAS connector C2. The second SAS backplane 120 has a first signal unit 121, a second signal unit 122, a first connecting unit 123, a second connecting unit 124, a first SAS connector C3, and a second SAS connector C4.

The signal units 111 and 121 respectively have a resistor. The resistor in the signal unit 111 is coupled between a pad V1 and the connecting unit 113, and the resistor in the signal unit 121 is coupled between a pad V3 and the connecting unit 123. The pads V1 and V3 on the SAS backplane 110 and 120 can provide the logic signal at high level as the logic signal with the first status value S1. The signal units 112 and 122 respectively have a pad V2 and a pad V4 to provide the logic signal at low level as the logic signal with the second status value S2. In this embodiment, the pads V1 and V3 can be the power source pads providing the voltage of 3.3 V, and the pads V2 and V4 can be the ground pads.

The second connector C2 in the first SAS backplane 110 is connected to the connector C5 on the system board 2 through a mini-SAS cable 22. In the conventional art, the SAS connectors C1-C5 have the GPIO pins which is not used by the server system, for example the pin A8 in the connector C5, the pin B8 and the pin A10 in the connectors C2 ad C4, and the pin B10 in the connectors C1 and C3. Here, the pin A10 of the second SAS connector C2 is electrically connected to the ground pad V2, and the pin B10 of the first SAS connector C1 and the pin B8 of the second SAS connector C2 are connected to the power source pad V1 through the resistor.

When the first and the second SAS backplanes 110 and 120 are serially connected together through the cable 23, the pin A10 of the SAS connector C4 is connected to the pin B10 of the SAS connector C1. It should be particularly noted that the detailed connecting method of the first SAS backplane 110 and the connector C5 on the system board 2, and the detailed connecting method of the second SAS backplane 120 and the first SAS backplane 110 can refer to the connecting architecture of the conventional SAS connector in the industry, so the details will not be described herein.

As shown in FIG. 2, the pin B8 of the second SAS connector C2 of the first SAS backplane 110 may be connected to the corresponding pin A8 in the connector C5 on the system board 2 through the sideband signal line in the cable 22. When the first and the second SAS backplanes 110 and 120 are serially connected together through the cable 23, the pin A10 of the SAS connector C4 of the second SAS backplane 120 is connected to the corresponding pin B10 in the SAS connector C1 of the first SAS backplane 110 through the sideband signal line in the cable 23. Because the pin A10 of the SAS connector C4 in the second SAS backplane 120 is connected to the ground pad V4 (i.e. the second signal unit 122) through the lead (i.e. the second connecting unit 124), the level of the logic signal on the lead (i.e. the first connecting unit) 113 is reduced to the low level S2 (i.e. logic 0). The master control unit 12 can read the logic signal on the lead (i.e. the first connecting unit) 113 through the pin A8 of the connector C5, the cable 22, and the pin B8 of the connector C2. Therefore, according to the level of the pin A8 in the connector C5 being the low level S2 (i.e. the logic 0), the master control unit 12 acquires that the second SAS backplane 120 is serially connected to the first SAS backplane 110. The master control unit 12 can perform the corresponding system parameter setting, so as to make the server system operate in the optimal setting.

On the contrary, if the first SAS backplane 110 is not serially connected to the second SAS backplane 120 (i.e. the pin A10 in the connector C4 is not connected to the pin B10 in the connector C1), the level of the lead (i.e. the first connecting unit) 113 is raised to the high level S1 (i.e. logic 1) by the signal unit 111 (i.e. the resistor and the power source pad V1). The master control unit 12 can read the logic signal on the lead (i.e. the first connecting unit) 113 through the pin A8 of the connector C5, the cable 22, and the pin B8 of the connector C2. Therefore, according to the level of the pin A8 in the connector C5 being the high level S1 (i.e. the logic 1), the master control unit 12 acquires that the first SAS backplane 110 is not serially connected to another SAS backplane. The master control unit 12 can perform the corresponding system parameter setting, so as to make the server system operate in the optimal setting.

That is, according to the received logic signal 0 or 1, the master control unit 12 determines whether the first SAS backplane 110 is serially connected to the second SAS backplane 120. If the logic signal received by the master control unit 12 is 0, it indicates that the first SAS backplane 110 is serially connected to the second SAS backplane 120. On the contrary, if the logic signal received by the master control unit 12 is 1, it indicates that the first SAS backplane 110 is not serially connected to the second SAS backplane 120. The master control unit 12 can set the system parameters of the server such as the maximum total number of the hard disks of the system or the rotating speed of the heatsink fan of the system according to the received logic signal, so as to make the server system operate in the optimal setting by the set system parameters, so as to prevent the disadvantage of the conventional server that the system parameter setting is not effective and cannot make the system effectively operate in the optimal state in time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A serial attached SCSI (SAS) backplane detection system, for detecting whether a second SAS backplane is serially connecting to a first SAS backplane in a server, the first SAS backplane and the second SAS backplane respectively having a first pin, a second pin, and a third pin, wherein when the second SAS backplane is serially connected to the first SAS backplane, the first pin of the first SAS backplane is connected to the third pin of the second SAS backplane, the SAS detection system comprising:

a first signal unit, disposed in the first SAS backplane for providing a logic signal with a first status value;

a second signal unit, disposed in the second SAS backplane for providing a logic signal with a second status value;

a first connecting unit, for electrically connecting the first pin and the second pin of the first SAS backplane, and the first signal unit;

a second connecting unit, for electrically connecting the third pin of the second SAS backplane, and the second signal unit; and a master control unit, disposed in a system board of the server, and connected to the second pin of the first SAS backplane, wherein when the first SAS backplane is not serially connected to the second SAS backplane, the logic signal with the first status value provided by the first signal unit is input to the master control unit through the second pin of the first SAS backplane; when the first SAS backplane is serially connected to the second SAS backplane, the logic signal with the second status value provided by the second signal unit is input to the master control unit through the third pin of the second SAS backplane, the first pin and the second pin of the first SAS backplane; the master control unit determines whether the first SAS backplane is serially connected to the second SAS backplane according to the received first status value or second status value, so as to set system parameters of the server accordingly.

2. The SAS backplane detection system as claimed in claim 1, wherein the system board has an SAS connector providing a fourth pin, and the first SAS backplane and the second SAS backplane respectively has a first SAS connector and a second SAS connector, the first pins of the first SAS backplane and the second SAS backplane are provided by the first SAS connectors, the second and the third pins of the first SAS backplane and the second SAS backplane are provided by the second SAS connectors, and the master control unit on the system board receives the logic signal transmitted by the second pin of the first SAS backplane through the fourth pin provided by the SAS connector.

3. The SAS backplane detection system as claimed in claim 2, wherein the second pin in the second SAS connector of the first SAS backplane is connected to the fourth pin in the SAS connector of the system board through a sideband signal line in a cable.

4. The SAS backplane detection system as claimed in claim 2, wherein the first, the second, and the third pins of the first and the second SAS backplanes and the fourth pin on the system board are general purpose input/output (GPIO) pins.

5. The SAS backplane detection system as claimed in claim 1, wherein the first signal unit comprises a pad on the first SAS backplane capable of providing a logic signal with a high level as the first status value.

6. The SAS backplane detection system as claimed in claim 5, wherein the pad is a power source pad.

7. The SAS backplane detection system as claimed in claim 1, wherein the second signal unit comprises a pad on the second SAS backplane capable of providing a logic signal with a low level as the second status value.

8. The SAS backplane detection system as claimed in claim 7, wherein the pad is a ground pad.

9. The SAS backplane detection system as claimed in claim 1, wherein the master control unit comprises a baseboard management controller (BMC) of the server.

10. The SAS backplane detection system as claimed in claim 1, wherein the system parameters comprise a maximum total number of hard disks of the server.

11. The SAS backplane detection system as claimed in claim 1, wherein the system parameters comprise a rotating speed of a heatsink fan of the server.

12. A serial attached SCSI (SAS) backplane, comprising:
   a first SAS connector, having a first pin;
   a second SAS connector, having a second pin and a third pin;
   a first signal unit, for providing a logic signal with a first status value;
   a second signal unit, for providing a logic signal with a second status value;
   a first connecting unit, for electrically connecting the first pin, the second pin, and the first signal unit; and
   a second connecting unit, for electrically connecting the third pin and the second signal unit;
   wherein when the SAS backplane is not serially connected to other SAS backplane, the logic signal with the first status value provided by the first signal unit is output to exterior through the second pin, and when the SAS backplane is serially connected to another SAS backplane, the logic signal with the second status value provided by another SAS backplane is output to exterior through the first pin and the second pin.

13. The SAS backplane as claimed in claim 12, wherein the second pin in the second SAS connector is connected to exterior through the sideband signal line in a cable.

14. The SAS backplane as claimed in claim 12, wherein the first, the second, and the third pins are GPIO pins.

15. The SAS backplane as claimed in claim 14, wherein the first pin is B10 pin of the first SAS connector.

16. The SAS backplane as claimed in claim 14, wherein the second pin is B8 pin of the second SAS connector, and the third pin is A10 pin of the second SAS connector.

17. The SAS backplane as claimed in claim 12, wherein the first signal unit comprises a pad on the SAS backplane capable of providing a logic signal with a high level as the first status value.

18. The SAS backplane as claimed in claim 17, wherein the first signal unit further comprises a resistor coupled between the pad and the first connecting unit.

19. The SAS backplane as claimed in claim 17, wherein the pad is a power source pad.

20. The SAS backplane as claimed in claim 12, wherein the second signal unit comprises a pad on the SAS backplane capable of providing a logic signal with a low level as the second status value.

21. The SAS backplane as claimed in claim 20, wherein the pad is a ground pad.

\* \* \* \* \*